Figure 1:
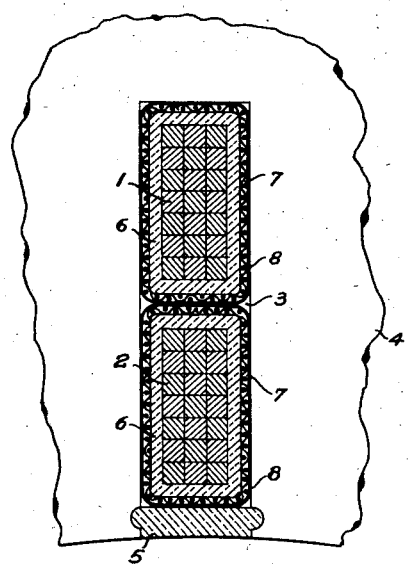

R. B. WILLIAMSON.
DYNAMO-ELECTRIC MACHINE.
APPLICATION FILED MAY 2, 1919.

1,418,856. Patented June 6, 1922.

Inventor
R. B. Williamson
by
Attorney

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE.

1,418,856.      Specification of Letters Patent.    Patented June 6, 1922.

Application filed May 2, 1919. Serial No. 295,011.

*To all whom it may concern:*

Be it known that ROBERT B. WILLIAMSON, a citizen of the United States, residing at Milwaukee, in the county of Milwaukee and State of Wisconsin, has invented a certain new and useful Improvement in Dynamo-Electric Machines, of which the following is a specification.

This invention relates to windings for dynamo electric machines and means for protecting the same.

In dynamo electric machines in which the windings or conductors are disposed in slots in a laminated core it has been found that the insulation of the conductors, particularly in machines of a higher voltage, becomes pitted and eroded sometimes to such an extent as to entirely break down the insulation. The cause of this erosion appears to be due to the effects of corona or other electrical discharges between the conductors and the walls of the slot or slots in which they are located. It appears further that the erosion of the insulation is perhaps due to a secondary effect of the electrical discharges, the latter forming ozone or one or more of the oxides of nitrogen. These compounds probably contribute of themselves to the erosion of the insulation, but if there is water or moisture present it is also possible that the oxides of nitrogen will combine therewith to form nitric acid which will then attack the insulation. If a conducting surface can be brought into intimate contact with the surfaces of the insulation of the conductor so as to eliminate the inevitable small spaces which are present between the surfaces and the walls of the slot, destructive electrical discharges may be effectually prevented. Furthermore, a layer of conducting material in intimate contact with the surface of the insulation will eliminate not only air pockets where ozone and compounds of nitrogen may form but also the chances of the presence of moisture.

One of the objects of this invention is to provide a dynamo electric machine and conductor in which the above noted difficulties are obviated and more particularly a conductor in which the outer surface of the insulation is provided with an intimate coating or layer of conducting material which layer as a whole is a good conductor.

Another object of the invention is the provision of a conductor having such a conducting layer as above noted in which means are provided for the prevention of the flow of eddy currents in said conducting layer.

Another object of the invention is the provision of a method whereby the conductor as set forth above may be produced.

Another object of the invention is the provision of a means and method whereby the conducting layer of such a conductor may be connected to some portion of the dynamo electric machine. Other objects will appear hereinafter as the description of the invention proceeds.

The novel features of the invention will appear from the specification and the accompanying drawings which form a part thereof and disclose one embodiment of said invention and all these novel features are intended to be particularly pointed out in the claims.

In the drawings Fig. 1 is a diagrammatic transverse sectional view showing conductors constructed in accordance with this invention disposed in a slot of a core a fragment of which is shown.

Figure 2:
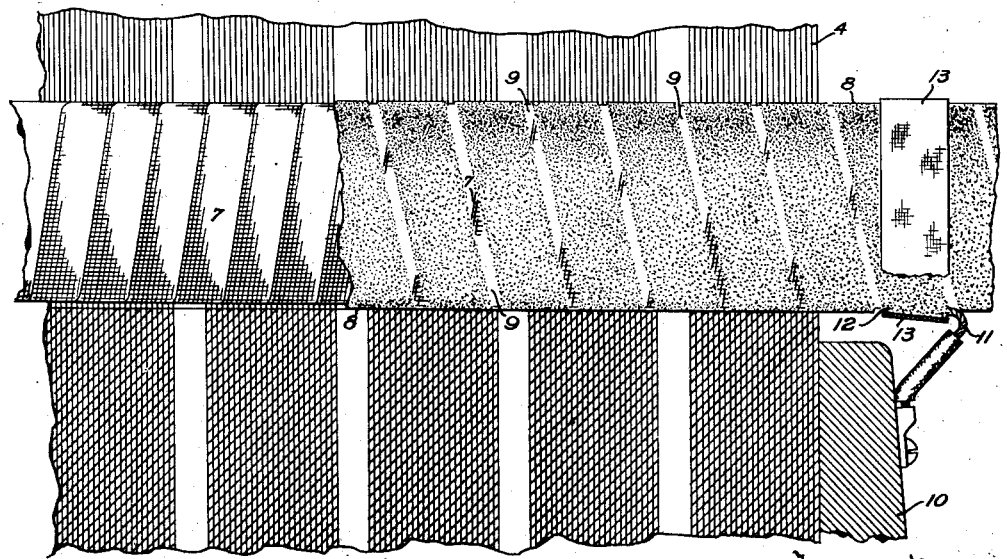

Fig. 2 is a diagrammatic view showing a longitudinal section of a core along a slot therein with a single conductor constructed in accordance with this invention disposed in the bottom of the slot, a portion of the core and the conducting layer of the conductor being broken away.

It is obvious that the number of conductors with which this invention is used and the number of conductors disposed in a single slot is immaterial and in the illustrated embodiment two conductors 1, 2 are shown disposed in a slot 3 in the core 4. The conductors are retained in the slot by any suitable means such as the wedge 5. Each conductor is provided with any suitable insulation 6 such as superimposed layers of mica and paper and with an outer covering, here shown as a helically wound tape of fabric 7. This tape is shown in conventional diagrammatic form and it is of course understood that it may be of any desirable thickness. The fabric 7 is coated with a closely adhering thin layer of conducting material 8, which may also be of any desired thickness and is indicated for the sake of convenience by the black line surrounding the fabric 7, although particles of the conducting layer in fact penetrate any pores in the fabric.

The conducting layer 8 is produced by spraying molten metal directly onto the fabric or other covering of the conductor. By this process a coating of any desired thickness may be secured, which coating is in exceedingly close and intimate contact with the surface of the insulation of the conductor. Furthermore it has a very good conductivity and it is clear that it will absolutely eliminate all air pockets such as would contribute to the destruction of the insulation of the conductor under the influence of electrical discharges.

It is desirable that losses and heating due to eddy currents in the conducting layer 8 be eliminated and this may be accomplished by providing a helical gap 9 in the conducting layer so as to break up electromotive forces having a direction longitudinal of the conductor. This helical gap is produced in the conducting layer by first winding a barrier such as a wire helically about the outer fabric or covering of the conductor before said covering is sprayed with the molten metal. After the spraying is completed the barrier or wire is removed by unwinding the same, thereby carrying away that portion of the conducting layer which was sprayed onto the wire and leaving the helical gap 9 as indicated.

In order to bring the conducting helical layer so formed to the same potential as the core or ground it may be connected to the end plate 10 for example, by means of a conductor 11, here shown as stranded. This conductor may be connected to the conducting layer 8 by holding said conductor in any suitable manner against the covering 7 before the metal is sprayed onto said covering so that the conductor 11 is itself covered with an integral part of the metal layer 8 as indicated at 12. For mechanical strength the conductor 11 may be held in place by some means here shown as a tape 13.

It should be understood that it is not desired that the invention claimed be limited to the exact details of construction shown and described for various modifications coming within the spirit of the invention may occur to persons skilled in the art.

It is claimed and desired to secure by Letters Patent:

1. In a dynamo electric machine, a core having a slot, a conductor in said slot provided with an insulating covering leaving an air-space extending from the exposed surface of said covering to a wall of said slot, and means for preventing the formation of electrical stresses in said air-space.

2. In a dynamo electric machine, a core having a slot, a conductor in said slot provided with an insulating covering, and a conducting layer in such intimate contact with the outer surface of said covering as to exclude air pockets between said surface and said layer.

3. In a dynamo electric machine, a core having a slot, a conductor in said slot provided with an insulating covering having a rough outer surface, and a conducting layer in such intimate contact with said outer surface as to exclude air pockets between said surface and said layer.

4. In a dynamo electric machine a core having a slot, a conductor in said slot provided with an insulating covering comprising an outer layer of fabric, and a continuous conducting layer, integral portions of which fill pores of the fabric.

5. In a dynamo electric machine, a core having a slot, a conductor in said slot provided with an insulating covering, a continuous layer of good conductivity superposed on said covering, and means for minimizing the flow of eddy-currents in said layer.

6. In a dynamo electric machine, a core having a slot, a conductor in said slot provided with an insulating covering, a continuous layer of good conductivity superposed on said covering, said layer having the form of an open helix.

7. In a dynamo electric machine, a core having a slot, a conductor in said slot provided with an insulating covering, and a continuous layer of metal superposed on said covering, said layer having the form of an open helix whereby the flow of eddy currents in said layer is minimized.

8. In a dynamo electric machine, a core having a slot, a conductor in said slot provided with an insulating covering, comprising an outer layer of fabric, a continuous conducting layer integral portions of which fill pores of the fabric, and means for minimizing the flow of eddy-currents in said layer.

9. In a dynamo electric machine, a core having a slot, a conductor in said slot provided with an insulating covering having a rough surface, and a continuous conducting layer superposed on said covering, said layer conforming to the roughness of said surface and being in the form of an open helix.

10. In a dynamo electric machine, a core having a slot, a conductor in said slot provided with an insulated covering having a rough surface, and a continuous conducting layer superposed on said covering, said layer conforming to the roughness of said surface and being in the form of an open helix, and an electrical connection between said helix and said core.

11. In a dynamo electric machine a core having a slot, a conductor in said slot provided with an insulating covering, a continuous layer of good conductivity superposed on said covering, an electrical connection between said layer and said core, and means for minimizing the flow of eddy-currents in said layer.

12. In a dynamo electric machine, a core having a slot, a conductor in said slot provided with an insulating covering leaving an air-space extending from the exposed surface of said covering to a wall of said slot, and means including a conducting layer on said covering and an electrical connection between said layer and said core for preventing the formation of electrical stresses in said air-space.

13. In a dynamo electric machine, a core having a slot, a conductor in said slot provided with an insulating covering, a continuous conducting layer superposed on said insulating covering and in intimate contact with the surface of said covering throughout the area of superposition, and an electrical connection between said conducting layer and said core.

14. In a dynamo electric machine, a core having a slot, a conductor in said slot provided with an insulating covering having a rough surface, a continuous conducting layer superposed on said covering, said layer conforming to the roughness of said surface, and an electrical connection between said conducting layer and said core.

15. In a dynamo electric machine, a core having a slot, a conductor in said slot provided with an insulating covering, and means for preventing the formation of electrical stresses in the air-space extending from the exposed surface of said covering to a wall of said slot, including means for bringing said exposed surface to the same potential as the wall of said slot.

In testimony whereof, the signature of the inventor is affixed hereto.

ROBERT B. WILLIAMSON.